United States Patent [19]
Daenens

[11] Patent Number: 5,873,592
[45] Date of Patent: Feb. 23, 1999

[54] SELF-STEERING TRAILER

[76] Inventor: Vern A. Daenens, 66455 Forest, New Haven, Mich. 48050

[21] Appl. No.: 766,749

[22] Filed: Dec. 13, 1996

[51] Int. Cl.⁶ .............................. B62D 12/00; B62D 13/04
[52] U.S. Cl. .............................. 280/410; 280/442; 280/99
[58] Field of Search ................................ 280/411.1, 410, 280/408, 442, 47.11, 103, 99, 100, 102, 443

[56] References Cited

U.S. PATENT DOCUMENTS

| | | | |
|---|---|---|---|
| 1,723,085 | 8/1929 | Sippel ...................................... | 280/442 |
| 2,255,525 | 9/1941 | Kline et al. .............................. | 280/442 |
| 3,820,811 | 6/1974 | Lapham .................................. | 280/408 |
| 4,244,596 | 1/1981 | Chung ..................................... | 280/442 |
| 4,934,726 | 6/1990 | Daenens et al. . | |
| 5,090,719 | 2/1992 | Hanaoka ................................. | 280/408 |

*Primary Examiner*—Brian L. Johnson
*Assistant Examiner*—Avraham H. Lerner
*Attorney, Agent, or Firm*—Brooks & Kushman P.C.

[57] ABSTRACT

A trailer assembly to be drawn by a towing vehicle is provided. The trailer assembly includes a frame having a front end, a rear end, and a central axis. A tongue has one end attached to the frame front end, the other end of the tongue is adapted for removable attachment to a towing vehicle for drawing the trailer. A pair of steerable front wheels cooperate with the frame front end on opposite sides of the central axis. The front wheels are retained by front wheel supports which are pivotally attached to the frame about a steering axis. Each front wheel has an axis of rotation offset from its steering axis to allow self-steering of the front wheels. A pair of steerable rear wheels cooperate with the frame and are mounted by rear wheel supports. A steering mechanism connects the front wheels to the rear wheels so as to mutually steer the rear wheels when the front wheels self-steer in response to the trailer being drawn by the towing vehicle. The rear wheels steer in a direction opposite that of the front wheels. The trailer may drawn by the towing vehicle by direct attachement of the trailer front hitch to the towing vehicle, or by connection in a train of trailer assemblies.

20 Claims, 3 Drawing Sheets

SELF-STEERING TRAILER

TECHNICAL FIELD

The present invention relates to trailer assemblies having a plurality of wheels to be towed by a towing vehicle in which all of the trailer wheels are simultaneously steered to achieve accurate tracking.

BACKGROUND ART

Over the years, there has been a great deal of effort to develop trailers that accurately track behind a towing vehicle. In many industrial applications, pulling a train of trailers behind a towing vehicle to distribute parts throughout a large plant is common. It is quite important for the trailers to track accurately behind the towing vehicle in order to prevent the trailers from colliding with obstacles, particularly when the train of trailers is long. To achieve accurate trailer tracking, many trailer manufacturers have gone to a four-wheel steered trailer. The wheels are steered in response to tongue rotation. Typically, a system of steering linkages, and in some instances a combination of steering linkages and cable arrangements are employed to interconnect the wheels and the tongue. An example of an existing tracking trailer is shown in U.S. Pat. No. 4,934,726 assigned to the assignee of the present invention which is incorporated herein by reference.

A primary disadvantage associated with existing trailer assemblies is the fact that the steering linkages and cable arrangements necessary for construction of a tongue to wheel connection increase the number of moving parts on the trailer, and increase the overall cost to manufacture the trailer.

SUMMARY OF THE INVENTION

It is, therefore, an object of the present invention to provide a self-steering trailer assembly to be drawn by a towing vehicle which eliminates the need for a costly tongue to wheel connection.

It is another object of the present invention to provide a self-steering trailer assembly to be drawn by a towing vehicle which enables a large number of trailers to be drawn in a train which accurately tracks the path of the towing vehicle.

In carrying out the above objects and other objects and features of the present invention, a trailer assembly to be drawn by a towing vehicle is provided. The trailer assembly includes a frame having a front end, a rear end, and a central axis. A tongue has one end attached to the frame front end. The other end of the tongue is adapted for removable attachment to a towing vehicle or to a rear hitch on another trailer assembly in a train. A pair of steerable front wheels cooperates with the frame front end. The front wheels are mounted on opposite sides of the central axis. Each front wheel is retained by a front wheel support which is pivotally attached to and rotatable relative to the frame about a steering axis. Each front wheel has an axis of rotation offset from its steering axis. This allows self-steering of the front wheels in a direction responsive to the trailer being drawn by the towing vehicle. The trailer may drawn by the towing vehicle by direct attachment of the trailer front hitch to the towing vehicle, or by connection in a train of trailer assemblies.

A pair of steerable rear wheels cooperate with the frame rear end and are mounted on opposite sides of the central axis. Each rear wheel is retained by a rear wheel support which is pivotally attached to and rotatable relative to the frame about a steering axis. Each rear wheel has an axis of rotation proximate the steering axis.

A steering mechanism connects the front wheels to the rear wheels so as to mutually steer the rear wheels with the front wheels when the front wheels self-steer in response to the trailer being drawn by the towing vehicle. The steering mechanism is configured so that the rear wheels steer in a direction opposite that of the front wheels.

The advantages accruing to the present invention are numerous. For example, the trailer assembly of the present invention provides a self-steering trailer assembly that eliminates the need for a costly tongue to wheel connection.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
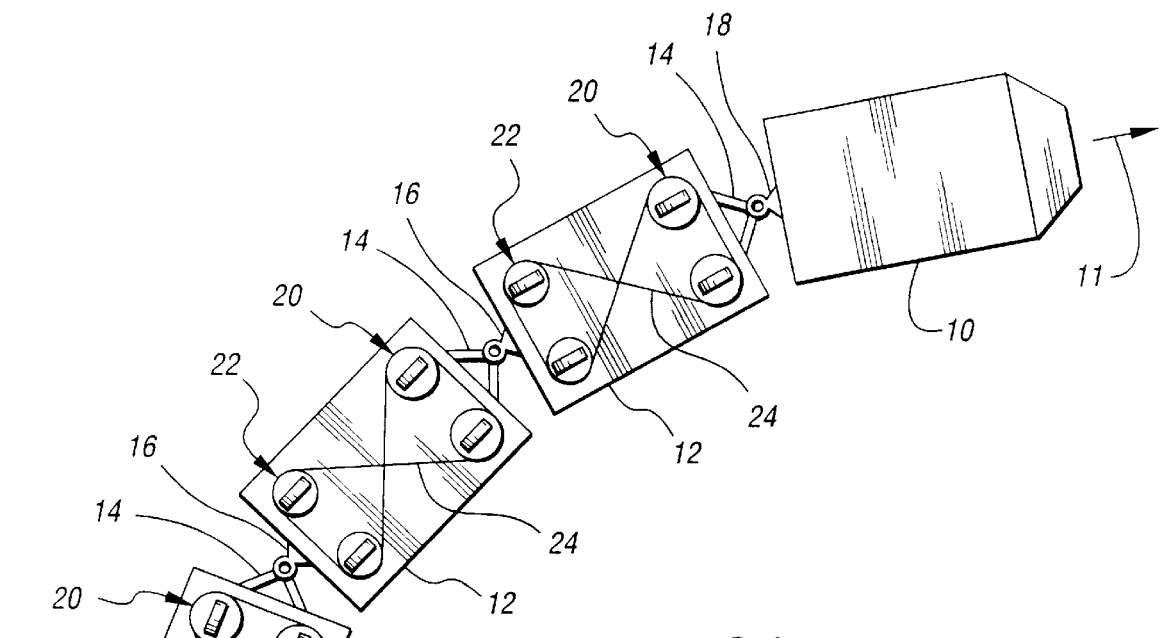
FIG. 1 is a top plan view of a towing vehicle drawing a train of trailers made in accordance with the present invention.
Figure 1:
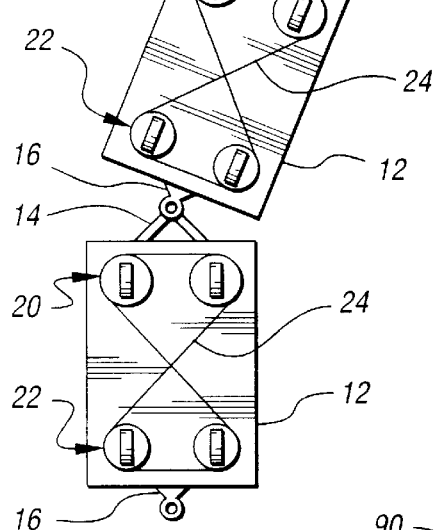

Referring now to FIG. 1, a towing vehicle 10 is shown towing a train of trailers 12 in the direction of arrow 11. Each trailer 12 has a tongue with one end attached to the trailer, and the other end of the tongue has a front hitch 14 for the trailer 12. Each trailer 12 also has a rear hitch 16. The towing vehicle 10 has a rear hitch 18 coupled to the front hitch of the first trailer in the train. The rear hitch 16 of each trailer 12 is connected to the front hitch 14 of the next trailer in the train. A trailer need not have a rear hitch if it is to be individually towed or if that trailer is the last trailer in the train.

Each trailer 12 in the train has front and rear steerable wheel assemblies indicated generally at 20 and 22, respectively. The front wheel assemblies 20 are connected to the rear wheel assemblies 22 by a steering mechanism, such as a flexible tensile member or cable 24. By configuring the cable 24 in a generally figure-8 shape, the rear wheels 22 steer in a direction opposite that of the front wheels 20 to effectively achieve four-wheel steering of the trailer.

Figure 2:
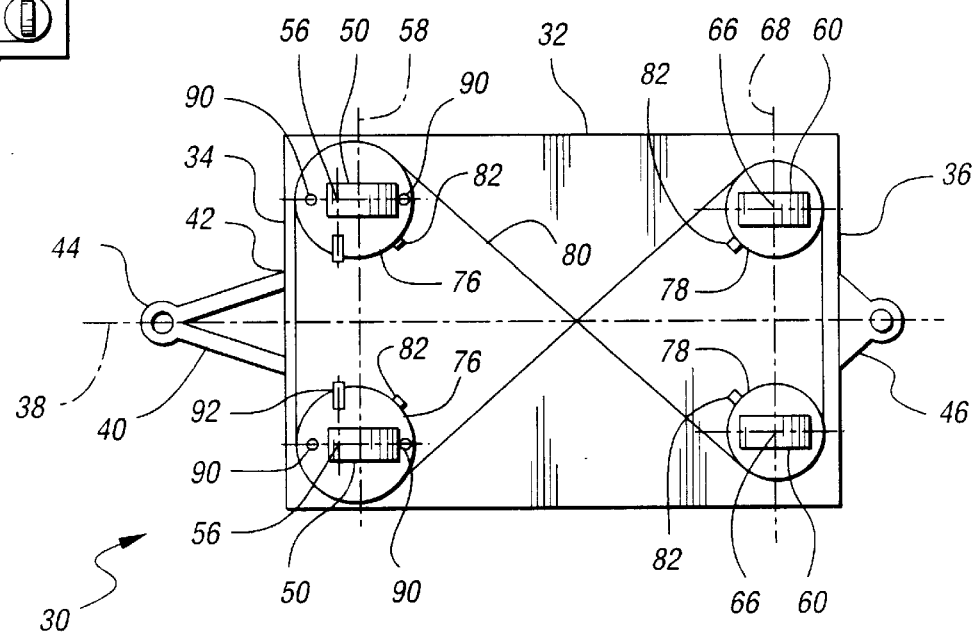
FIG. 2 is a top plan view of a first embodiment of a trailer assembly of the present invention.
Figure 3:
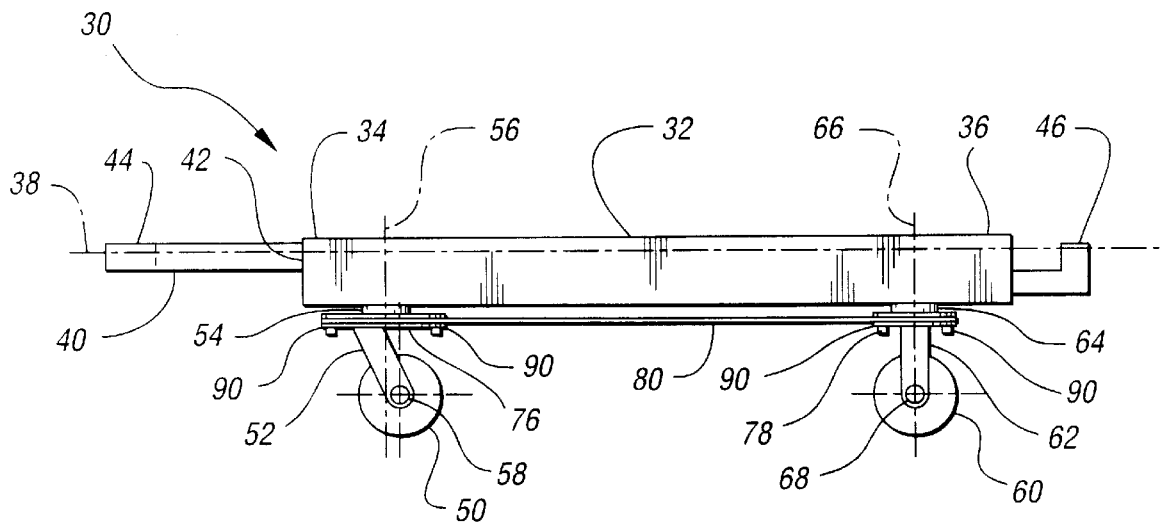
FIG. 3 is a side elevational view of the trailer assembly of FIG. 2.

With reference to FIGS. 2 and 3, a first embodiment of a trailer assembly of the present invention is generally indicated at 30, and will be described in detail. The trailer assembly 30 is provided with a frame 32 which is generally rectangular in shape. The frame has a front end 34, a rear end 36, and a central axis 38. The trailer 30 is drawn by its tongue 40 which has one end 42 attached to the frame front end 34. The other end 44 of the tongue 40 defines a hitch member adapted for removable attachment to a towing vehicle or the rear hitch of another trailer. Trailer assembly 30 is shown having a rear hitch 46, the rear hitch 46 is adapted for removable attachment to a next trailer assembly in a train of trailer assemblies.

A pair of steering front wheels 50 cooperate with the frame front end 34. The front wheels 50 are located on opposite sides of the central axis 38. To facilitate an understanding of the present invention, both front wheels 50 are shown to be identical. Front wheel 50 is retained by wheel support 52 which is pivotally attached to the frame front end 34 and abuts bearing plate 54. The wheel support 52 is rotatable relative to the frame 32 about a steering axis 56. Each front wheel 50 has an axis of rotation 58 offset from its steering axis 56. This offset allows self-steering of the front wheels 50 in a direction responsive to the trailer 30 being drawn by the towing vehicle. As the trailer 30 is pulled, the front wheel supports 52 swivel along bearing plate 54 to turn the front wheels 50. The trailer 30 may drawn by the towing vehicle by direct attachment of the trailer front hitch 44 to the towing vehicle, or by connection in a train of trailer assemblies.

A pair of steerable rear wheels 60 cooperate with the frame rear end 36. The rear wheels 60 are located on opposite sides of the central axis 38. To facilitate an understanding of the present invention, both rear wheels 60 are shown to be identical. Each rear wheel 60 is retained by a rear wheel support 62 which is pivotally attached to the frame rear end 36 and abuts a bearing plate 64. Each rear wheel 60 is rotatable relative to the frame 32 about a steering axis 66. The axis of rotation 68 of each rear wheel 60 is proximate the steering axis 66 of the respective rear wheel 60. The steering axis 66 and axis of rotation 68 are located in close proximity to minimize any rear wheel response due to the trailer being pulled. This allows the use of a steering mechanism to control the rear wheels, a first embodiment of which will now be described.

As best shown in FIG. 2, a pair of front pulleys 76 are fixedly mounted to the front wheel supports 52 to rotate together with the front wheel supports 52. A pair of rear pulleys 78 are fixedly mounted to the rear wheel supports 62 to rotate together with the rear wheel supports 62. A flexible tensile member or cable 80 is positioned in a generally figure-8 shaped arrangement about the front and rear pulleys 76 and 78, respectively. The cable 80 connects the front wheels 50 to the rear wheels 60 so as to mutually steer the rear wheels 60 with the front wheels 50. As the trailer 30 is pulled by the tongue 40 in a particular direction, the front wheels 50, due to their previously described construction, will self-steer or swivel accordingly. The rear wheels 60 will steer in a direction opposite that of the front wheels 50 when the rear wheel supports 62 are rotated relative to the frame 32 by the cable 80.

In addition to frictionally engaging the cable 80 with the pulleys, the cable 80 is held in place on each pulley by a suitable fastening device such as a clamp 82. At each pulley, the cable 80 extends sufficiently around the pulley, and may overlap on a portion of the pulley as shown to allow placement of the clamps 82.

In a preferred embodiment, each of the front pulleys 76, has a pair of stop posts 90 extending from one face. Mounted to the frame 32 at each front pulley 76 is an L-shaped member 92. In the event that the trailer assembly 30 is urged in a rearward direction, the front wheels 50 will begin to rotate, and one of the stop members 90 on each front pulley 76 will abut the corresponding L-shaped member 92 to prevent the front wheels front rotating 180°. The cooperation of the stop posts 90 and L-shaped members 92 effectively limits the range of turning allowed for front wheels 50. This prevents over tensioning of the cable 80 that could be caused if the front wheels 50 rotate too far in any one direction.

The front pulleys are sized relative to the rear pulleys based on front and rear wheel location relative to overall trailer length to determine the extent that the rear wheels 60 will steer in response to the front wheels 50. The ratio of the front pulley diameter $D_1$ to the rear pulley diameter $D_2$ determines this extent. A method for determining a suitable pulley ratio for the trailer assembly will now be described.

Figure 4:
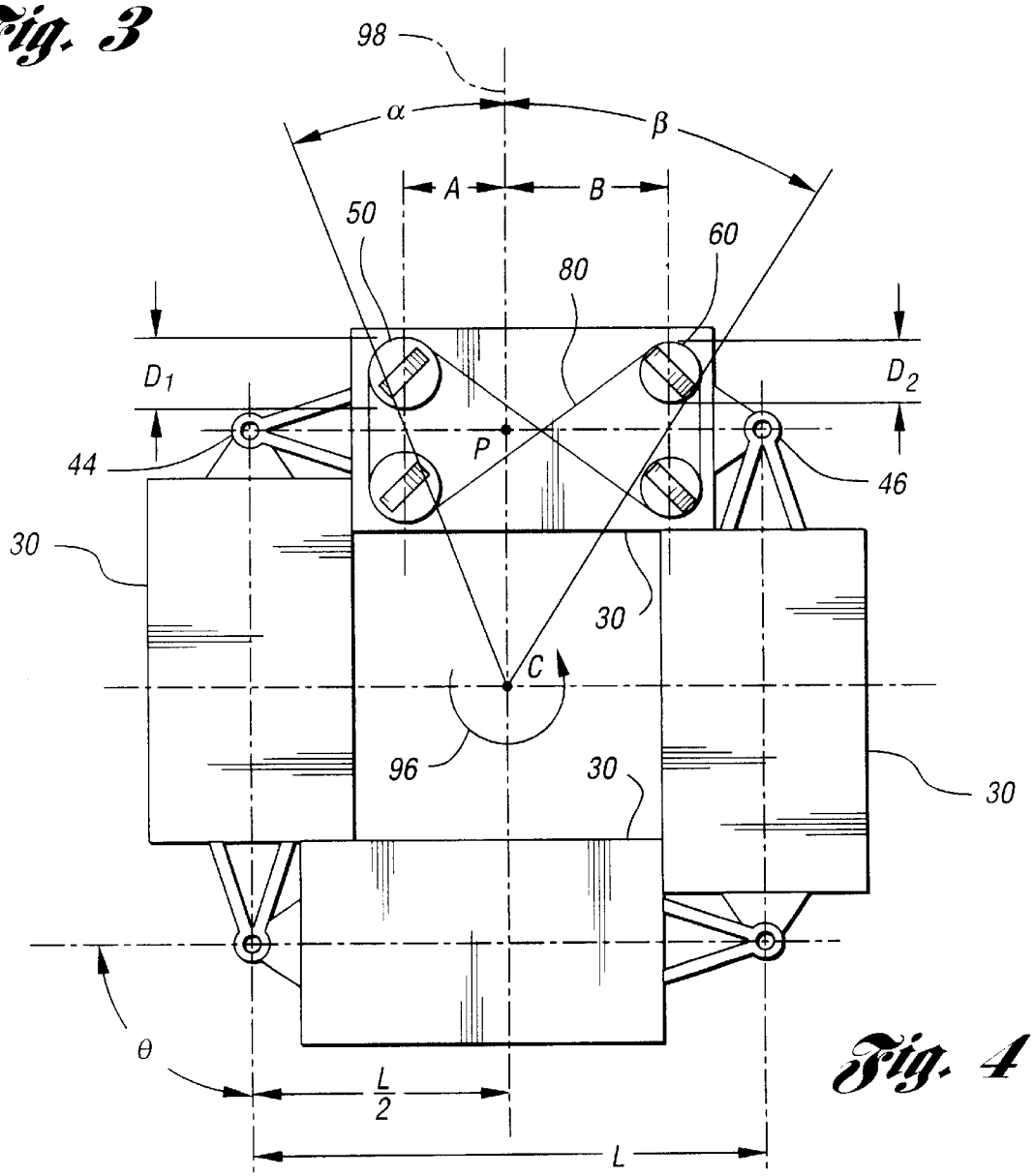
FIG. 4 is a schematic diagram illustrating an analysis of a steering mechanism on a trailer assembly of the present invention.

Referring to FIG. 4, four trailer assemblies are shown connected in an endless train moving in the direction indicated by arrow 96. Each trailer assembly 30 is constructed as previously described. Overall trailer length L is defined as the distance between the front hitch 44 and the rear hitch 46. The center of the trailer is located at a distance of L/2 from either hitch and is indicated at point P. A transverse axis 98 passes through the center P of the trailer. The front wheels 50 are offset a distance A from the trailer center P. The rear wheels 60 are offset a distance B from the trailer center P. Each trailer is shown turning at an angle θ, depicted as 90° in the four trailer endless train.

In order for the endless train to continuously travel in a perfect circular path as shown, it is necessary that the trailers are symmetric with respect to each other and have the same instantaneous center, indicated at C. In the following calculations, a ratio of the front pulley diameter $D_1$ to the rear pulley diameter $D_2$ will be determined. In the four trailer arrangement, each trailer has a turning radius of L/2. This value is defined as the distance from the instantaneous center C to the trailer center P. The turning angles α and β of the front and rear wheels 50 and 60, respectively, are:

$$\alpha = \arctan(A/(L/2))$$

$$\beta = \arctan(B/(L/2))$$

Further, the ratio of the front pulley diameter $D_1$ to the rear pulley diameter $D_2$ is:

$$D_1/D_2 = \beta/\alpha$$

In one embodiment of the present invention, the overall trailer length L is equal to 150 inches, thereby placing the trailer center P at a distance of 75 inches from the instantaneous center C. The front wheels 50 are offset a distance of 27 inches from transverse axis 98, and rear wheels 60 are offset a distance of 51 inches from transverse axis 98. Calculating the pulley ratio by using a four trailer endless train, results in the front wheel turning angle α equal to about 19.8°, and the rear wheel turning angle β equal to about 34.2°. These calculations result in a pulley ratio $D_1/D_2$ of about 1.73.

The above calculations calibrate the pulley diameters so that the trailer will turn perfectly when turning at an angle of θ, or 90° in the above-described example. It is to be understood that any turning angle for a trailer can be used to calculate the pulley ratio, the above described four trailer endless train is one example of a pulley ratio calculation.

As the turn angle θ used in the calculation of a pulley ratio decreases, or equivalently, the number of trailers in the endless train increases, the pulley ratio calculated approaches a value of B/A. In the above example, a value of about 1.89 is the limiting pulley ratio. In the above described embodiment, allowing for reasonable tolerances, a suitable pulley ratio is between about 1.5 and about 2.0.

Figure 5:
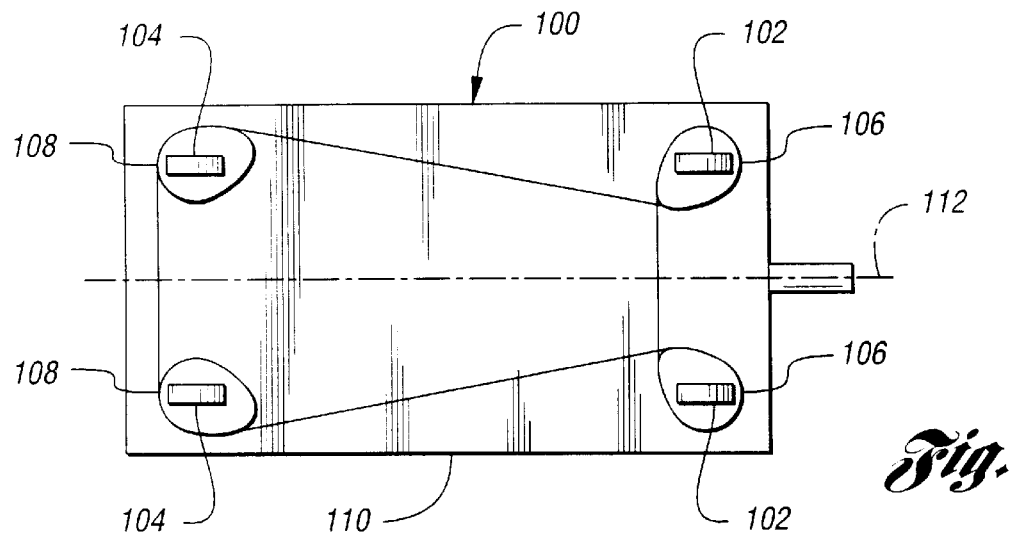
FIG. 5 is a top plan view of a second embodiment of the present invention.

Referring to FIG. 5 a second embodiment of the present invention is shown. A trailer 100 has front and rear wheels 102 and 104, respectively. Front and rear pulleys 106 and 108 are mounted to the front and rear wheels 102 and 104, respectively. The pulleys are connected by a cable 110 positioned in a generally rectangular shaped arrangement about the pulleys. Each pulley is sufficiently cam shaped so that when front wheels 102 steer toward one side of the trailer frame central axis 112, the front wheel and rear wheel located on the that one side steer a greater amount than the front wheel and rear wheel located on the other side of the trailer frame central axis 112. That is, during a turn, the inside wheels rotate through a smaller effective radius on the pulleys than the outside wheels. This compensates for the larger turning radius at the outside of the turn relative to at the inside of the turn. The sizes and shapes of the cam shaped pulleys 106 and 108 can be determined in accordance with the previously described method (FIG. 4).

It is to be appreciated that unlike the construction shown in FIG. 5, circular pulleys could be used with a rectangular cable arrangement. Further, a combination of rear circular pulleys and front cam shaped pulleys, or front circular pulleys and rear cam shaped pulleys could be used to achieve an embodiment of the present invention.

Figure 6:
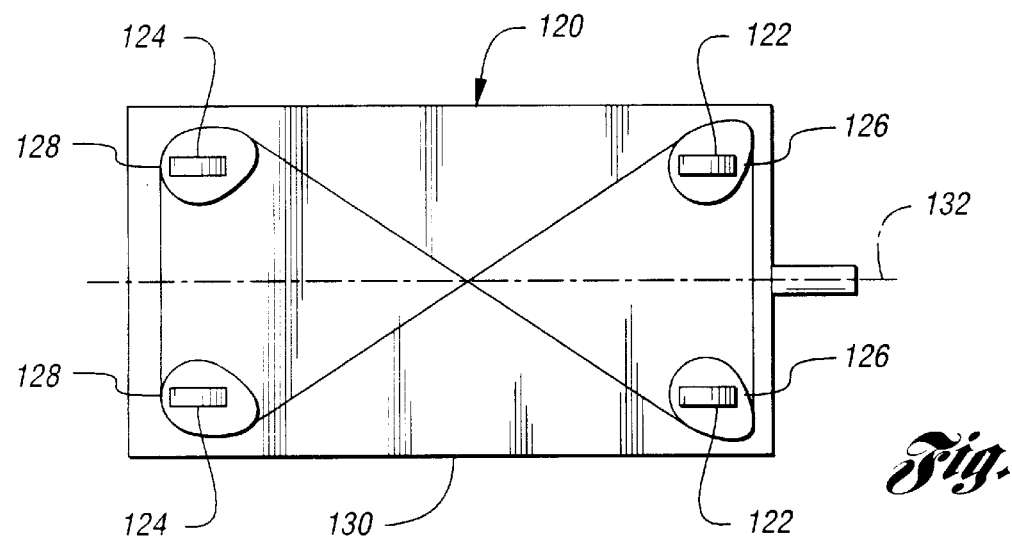
FIG. 6 is a top plan view of a third embodiment of the present invention.

Referring to FIG. 6 a third embodiment of the present invention is shown. A trailer 120 has front and rear wheels 122 and 124, respectively. Front and rear pulleys 126 and 128 are mounted to the front and rear wheels 122 and 124, respectively. The pulleys are connected by a cable 130 positioned in a generally figure-8 shaped arrangement. Each pulley is sufficiently cam shaped so that the wheels on each side of the trailer frame central axis 132 steer at appropriate turning radii relative to each other when the trailer is drawn toward one side or the other. That is, during a turn, the inside wheels rotate through a smaller effective radius on the pulleys than the outside wheels.

Figure 7:
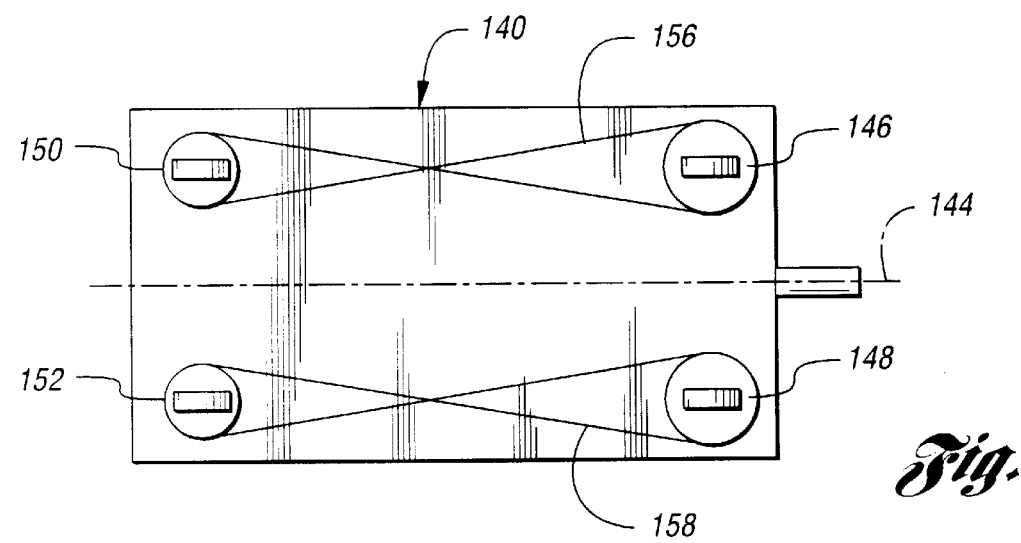
FIG. 7 is a top plan view of a fourth embodiment of the present invention.

Referring to FIG. 7 a fourth embodiment of the present invention is shown. A trailer 140 has a central axis 144, front wheel assemblies 146 and 148, and rear wheel assemblies 150 and 152. Each wheel assembly employs a pulley and wheel support arrangement as previously described. Front wheel 146 is located on the same side of central axis 144 as rear wheel 150, and front wheel 148 is located on the same side of central axis 144 as rear wheel 152.

A first flexible tensile member such as cable 156 connects front wheel 146 and rear wheel 150, and is positioned in a generally figure-8 shaped arrangement. A second flexible tensile member such as cable 158 connects front wheel 148 and rear wheel 152, and is also positioned in a generally figure-8 shaped arrangement. By independently connecting each side of the front and rear wheels, the front and rear wheels are able to independently steer at appropriate turning radii.

Although the present invention has been described in considerable detail with reference to certain preferred versions thereof, other versions are possible. For example, an embodiment of the trailer assembly of the present invention can be achieved with a mechanical linkage arrangement connecting the front wheels to the rear wheels which steers the rear wheels in response to self-steering of the front wheels. Further, other cable arrangements are possible which would achieve the desired self-steering of a trailer assembly in accordance with the present invention. It is to be appreciated that there are many mechanical configurations for connecting the front wheels to the rear wheels which achieve rear wheel steering responsive to the front wheel self-steering.

While the best mode for carrying out the invention has been described in detail, those familiar with the art to which this invention relates will recognize various alternative designs and embodiments for practicing the invention as defined by the following claims.

What is claimed is:

1. A trailer assembly to be drawn by a towing vehicle, the trailer assembly comprising:

a frame having a front end, a rear end, and a central axis;

a tongue having two ends, one end of the tongue being attached to the frame front end, the other end of the tongue being adapted for removable attachment to a towing vehicle for drawing the trailer assembly;

a pair of steerable front wheels cooperating with the frame front end on opposite sides of the central axis, each front wheel being retained by a front wheel support which is pivotally attached to the frame and rotatable relative to the frame about a steering axis, and each front wheel having an axis of rotation offset from its steering axis so as to allow self-steering of the front wheels in a direction responsive to the trailer assembly being drawn by the towing vehicle;

a pair of steerable rear wheels cooperating with the frame rear end on opposite sides of the central axis, each rear wheel being retained by a rear wheel support which is pivotally attached to the frame and rotatable relative to the frame about a steering axis, and each rear wheel having an axis of rotation proximate the steering axis;

a pair of front pulleys fixedly mounted to the front wheel supports to rotate together with the front wheel supports;

a pair of rear pulleys fixedly mounted to the rear wheel supports to rotate together with the rear wheel supports the rear pulleys being relatively smaller in size than the front pulleys; and at least one flexible tensile member entrained about the front and rear pulleys, thereby connecting the front wheels to the rear wheels so as to mutually steer the rear wheels with the front wheels when the front wheels self-steer in response to the trailer assembly being drawn by the towing vehicle, the rear wheels steering in a direction opposite and at an angle greater than that of the front wheels.

2. The trailer assembly of claim 1 wherein the at least one flexible member comprises:

a single generally figure-8 shaped arrangement extending about the two front wheels and the two rear wheels.

3. The trailer assembly of claim 1 wherein the front pulleys are sized relative to the rear pulleys based on front and rear wheel location relative to overall trailer length.

4. The trailer assembly of claim 1 wherein the front and rear pulleys are generally circular in shape.

5. The trailer assembly of claim 1 wherein the front and rear pulleys are sufficiently cam shaped so that when the front wheels steer toward one side of the trailer frame central axis, the front wheel and rear wheel located on the one side steer a greater amount than the front wheel and rear wheel located on the other side of the trailer frame central axis.

6. The trailer assembly of claim 1 wherein the at least one flexible tensile member comprises:

a first flexible tensile members positioned in a generally figure-8 shaped arrangement about the front pulley and rear pulley on one side of the trailer frame central axis; and a second flexible tensile members positioned in a generally figure-8 shaped arrangement about the front pulley and rear pulley on the other side of the trailer frame central axis, thereby connecting the front wheels to the rear wheels.

7. The trailer assembly of claim 6 wherein the front pulleys are sized relative to the rear pulleys based on front and rear wheel location relative to overall trailer length.

8. The trailer assembly of claim 1 wherein the at least one flexible tensile member comprises:

a flexible tensile member positioned in a generally rectangular shaped arrangement about the front and rear pulleys, thereby connecting the front wheels to the rear wheels.

9. The trailer assembly of claim 8 wherein the front pulleys are sized relative to the rear pulleys based on front and rear wheel location relative to overall trailer length.

10. The trailer assembly of claim 8 wherein the front and rear pulleys are generally circular in shape.

11. The trailer assembly of claim 8 wherein the front and rear pulleys are sufficiently cam shaped so that when the front wheels steer toward one side of the trailer frame central axis, the front wheel and rear wheel located on the one side steer a greater amount than the front wheel and rear wheel located on the other side of the trailer frame central axis.

12. A trailer assembly to be drawn by a towing vehicle, the trailer assembly comprising:

a frame having a front end, a rear end, and a central axis;

a tongue having two ends, one end of the tongue being attached to the frame front end, the other end of the tongue being adapted for removable attachment to a towing vehicle for drawing the trailer assembly;

a pair of steerable front wheels cooperating with the frame front end on opposite sides of the central axis, each front wheel being retained by a front wheel support which is pivotally attached to the frame and rotatable relative to the frame about a steering axis, and each front wheel having an axis of rotation offset from its steering axis so as to allow self-steering of the front wheels in a direction responsive to the trailer assembly being drawn by the towing vehicle;

a pair of front pulleys fixedly mounted to the front wheel supports to rotate together with the front wheel supports;

a pair of steerable rear wheels cooperating with the frame rear end on opposite sides of the central axis, each rear wheel being retained by a rear wheel support which is pivotally attached to the frame and rotatable relative to the frame about a steering axis, and each rear wheel having an axis of rotation proximate the steering axis;

a pair of rear pulleys fixedly mounted to the rear wheel supports to rotate together with the rear wheel supports the pair of rear pulleys being sized relatively smaller than the pair of front pulleys; and a flexible tensile member positioned about the front and rear pulleys connecting the front wheels to the rear wheels so as to mutually steer the rear wheels with the front wheels when the front wheels self-steer in response to the trailer assembly being drawn by the towing vehicle, the rear wheels steering in a direction opposite to and at an angle greater than that of the front wheels.

13. The trailer assembly of claim 12 wherein the flexible tensile member is positioned in a generally figure-8 shaped arrangement.

14. The trailer assembly of claim 13 wherein the front pulleys are sized relative to the rear pulleys based on front and rear wheel location relative to overall trailer length.

15. The trailer assembly of claim 13 wherein the front and rear pulleys are sufficiently cam shaped so that when the front wheels steer toward one side of the trailer frame central axis, the front wheel and rear wheel located on the one side steer a greater amount than the front wheel and rear wheel located on the other side of the trailer frame central axis.

16. The trailer assembly of claim 12 wherein the flexible tensile member is positioned in a generally rectangular shaped arrangement.

17. The trailer assembly of claim 16 wherein the front pulleys are sized relative to the rear pulleys based on front and rear wheel location relative to overall trailer length.

18. The trailer assembly of claim 16 wherein the front and rear pulleys are sufficiently cam shaped so that when the front wheels steer toward one side of the trailer frame central axis, the front wheel and rear wheel located on the one side steer a greater amount than the front wheel and rear wheel located on the other side of the trailer frame central axis.

19. A trailer assembly to be drawn by a towing vehicle, the trailer assembly comprising:

a frame having a front ends a rear end, and a central axis;

a tongue having two ends, one end of the tongue being attached to the frame front end, the other end of the tongue being adapted for removable attachment to a towing vehicle for drawing the trailer assembly;

a pair of steerable front wheels cooperating with the frame front end on opposite sides of the central axis, each front wheel being retained by a front wheel support which is pivotally attached to the frame and rotatable relative to the frame about a steering axis, and each front wheel having an axis of rotation offset from its steering axis so as to allow self-steering of the front wheels in a direction responsive to the trailer assembly being drawn by the towing vehicle;

a pair of front pulleys fixedly mounted to the front wheel supports to rotate together with the front wheel supports;

a pair of steerable rear wheels cooperating with the frame rear end on opposite sides of the central axis, each rear wheel being retained by a rear wheel support which is pivotally attached to the frame and rotatable relative to the frame about a steering axis, and each rear wheel having an axis of rotation proximate the steering axis;

a pair of rear pulleys fixedly mounted to the rear wheel supports to rotate together with the rear wheel supports the pair of rear pulleys being sized relatively smaller than the pair of front pulleys;

a first flexible tensile members positioned in a generally figure-8 shaped arrangement about the front pulley and rear pulley on one side of the trailer frame central axis; and a second flexible tensile members positioned in a generally figure-8 shaped arrangement about the front pulley and rear pulley on the other side of the trailer frame central axis, thereby connecting the front wheels to the rear wheels so as to mutually steer the rear wheels with the front wheels when the front wheels self-steer in response to the trailer assembly being drawn by the towing vehicle, the rear wheels steering in a direction opposite and at an angle greater than that of the front wheels so as to mutually steer the rear wheels with the front wheels when the front wheels self-steer in response to the trailer assembly being drawn by the towing vehicle the rear wheels steering in a direction opposite and at an angle greater than that of the front wheels.

20. The trailer assembly of claim 19 wherein the front pulleys are sized relative to the rear pulleys based on front and rear wheel location relative to overall trailer length.

* * * * *